United States Patent
Nagaoka et al.

(10) Patent No.: US 7,465,416 B2
(45) Date of Patent: *Dec. 16, 2008

(54) METHOD FOR DESIGNING A MOLD, METHOD FOR PRODUCING AN INJECTION MOLDING, PROGRAM AND INJECTION MOLDING DEVICE

(75) Inventors: Shinichi Nagaoka, Ichihara (JP); Tomoo Hirota, Ichihara (JP); Yoshiaki Togawa, Kyoto (JP)

(73) Assignee: Sumitomo Chemical Company, Limited, Osaka (JP)

( * ) Notice: Subject to any disclaimer, the term of this patent is extended or adjusted under 35 U.S.C. 154(b) by 583 days.

This patent is subject to a terminal disclaimer.

(21) Appl. No.: 10/812,052

(22) Filed: Mar. 30, 2004

(65) Prior Publication Data

US 2005/0082706 A1   Apr. 21, 2005

(30) Foreign Application Priority Data

Mar. 31, 2003 (JP) ............................. P2003-094452
May 23, 2003 (JP) ............................. P2003-145629

(51) Int. Cl.
*B29C 45/27* (2006.01)
*B29C 45/76* (2006.01)

(52) U.S. Cl. .................. 264/40.1; 264/219; 425/145; 700/98; 700/200

(58) Field of Classification Search ............. 264/40.1, 264/40.7, 219; 425/145, 163; 700/200, 98, 700/118, 182, 197
See application file for complete search history.

(56) References Cited

U.S. PATENT DOCUMENTS 6,096,088 A * 8/2000 Yu et al. ................... 703/9
6,454,973 B1 * 9/2002 Norton ..................... 264/40.1
6,816,820 B1 * 11/2004 Friedl et al. ............... 703/2
2003/0149498 A1 * 8/2003 Rebello et al. ............. 700/97
2004/0047935 A1 * 3/2004 Moss et al. ................ 425/145

FOREIGN PATENT DOCUMENTS

JP     08-118420 A     5/1996

(Continued)

OTHER PUBLICATIONS

Menges, Georg et al., How to Make Injection Molds, third edition, Hanser Publishers, 2001, pp. 143-203 and 493-525.*

(Continued)

*Primary Examiner*—Jill L Heitbrink
(74) *Attorney, Agent, or Firm*—Sughrue Mion, PLLC

(57) ABSTRACT

An object of the present invention is to provide a method for designing a mold and a method for producing an injection molding in which a mold clamping force or weld line occurrence can be more accurately controlled in the case of injection molding of a resin product. In the case where an injection molding is carried out using a mold having a plurality of resin inflow conduits G1, G2, G3 to a cavity CV, a mold design parameter in relation to at least one of the arrangement, the shapes and the sizes of the resin inflow conduits is determined by the combination of a numerical analysis method for calculating an injection molding process and a computer-aided optimization method, for the purpose of obtaining a preferable injection molding condition. Thereby the mold design parameter can be promptly and accurately calculated without repetition of trial and error manually.

11 Claims, 11 Drawing Sheets

FOREIGN PATENT DOCUMENTS

| | | |
|---|---|---|
| JP | 2001-277308 A | 10/2001 |
| JP | 2002-355866 A | 12/2002 |
| WO | WO 02/100623 A1 | 12/2002 |

OTHER PUBLICATIONS

Tucker, Charles L. III, Fundamentals of Computer Modeling for Polymer Processing, Hanser Publishiers, 1989, pp. 142-236.*

Nagaoka et al., "Application of CAO Technique to Injection Molding Analysis", V-212, Jun. 13, 2003, with English Abstract.

Nagaoka et al., "Application of CAO Technique to Injection Molding Analysis", C217, Nov. 4, 2003, with English Abstract.

Nagaoka et al., "New Method of Designing Runner System for Injection Mold Using CAO Technique", ANTEC 2004.

* cited by examiner

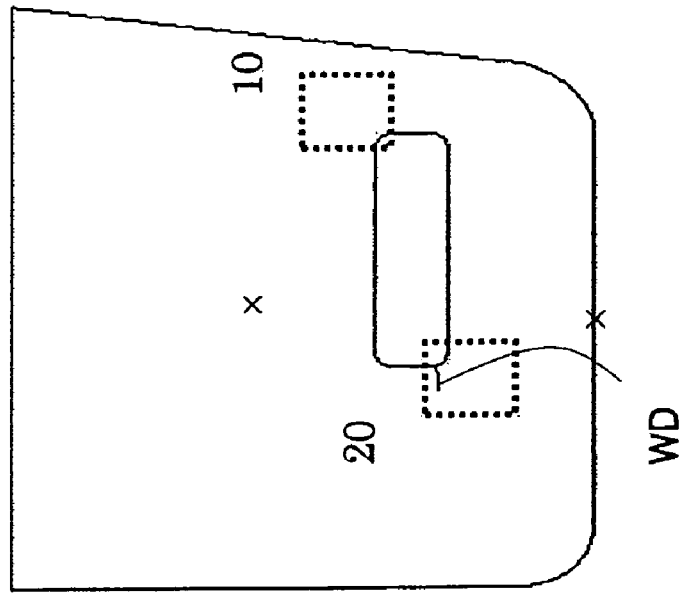
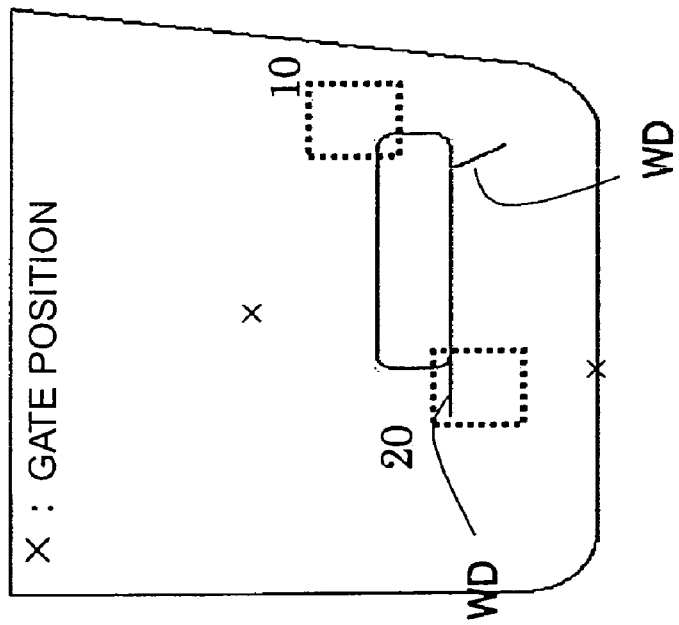

METHOD FOR DESIGNING A MOLD, METHOD FOR PRODUCING AN INJECTION MOLDING, PROGRAM AND INJECTION MOLDING DEVICE

BACKGROUND OF THE INVENTION

1. Field of the Invention

The present invention relates to a method for designing a mold in the case of injection molding of resin, a program for making a computer carry out the process of injection molding, a method for producing an injection molding that produces the injection molding using the mold, and an injection molding device.

2. Related Background Art

In injection molding, a plurality of gates are required depending on the size and the shape of a is product. In this case, as described below, there have been made proposals of improvement in molding process aspect or in product quality aspect, such as reduction in necessary mold clamping force and weld line position control, through controlling the state of flow of the molten material inflow through the gates.

For example, Japanese Patent Laid-open Gazette No. 2002-355866, page 2 discloses, in the case where the product shape extends in a longitudinal direction, that a plurality of gates through which molten resin is injected into the cavity are arranged along the direction from the resin filling starting side to the filling completion side, and the molten resin is sequentially injected into the cavity at a specified interval starting with the injection at the filling starting gate, thereby to reduce a mold clamping force required for molding.

Also Japanese Patent Laid-open Gazette No. Heisei 8-118420, pages 2 and 3 describes the prevention of weld line occurrence by injecting a softened resin material from the second gate into the cavity at almost the same time when the resin is injected from the first gate passes over the second gate, or after the resin is injected from the first gate passes over the second gate.

Further, Japanese Patent Laid-open Gazette No. 2001-277308, pages 7 to 9 discloses a technology to predict the location of weld lines generated in a molding through flow simulation of a molding process by dividing the shape of the molding into fine elements, further by adjusting the open or close of valve gates on the basis of thus predicted weld lines to shift the weld lines to a preferable modified location.

SUMMARY OF THE INVENTION

However, the method disclosed in the Japanese Patent Laid-open Gazette No. 2002-355866, page 2, or the Japanese Patent Laid-open Gazette No. Heisei 8-118420, pages 2 to 3, requires to repeat trial and error manually trusting intuition or experience to judge the timing of injection start, reduction of an inflow, or injection stop from a gate. In a method described in pages 7 to 9 of the Japanese Patent Laid-open Gazette No. 2001-277308, the entire location of the weld lines is not controlled, but a correction value is calculated at only one specific point on a weld line. Consequently, it is difficult to control a complexly-shaped weld line where the resin flows from three directions merge. Also according to the methods of these patent documents, gates are regulated under the predetermined condition of gate location, so the best results cannot always be expected.

The present invention, in view of the foregoing problems, has an object to provide a method for designing a mold, a method for producing an injection molding, a program and an injection molding device that can properly control a mold clamping force or weld line occurrence in the event of injection molding of a resin product.

The method for designing a mold according to the present invention has been made in order to achieve the above-described object, in an event of implementation of injection molding using a mold having a plurality of resin inflow conduits to cavity, comprising a step of determining a mold design parameter which is related to at least one of the arrangement, the shapes and the sizes of the resin inflow conduits, by combination of a numerical analysis method for calculating an injection molding process and a computer-aided optimization method, for the purpose of obtaining a desired injection molding condition.

Thus the mold design parameter can be calculated without repetition of trial and error manually by determining the mold design parameter in relation to at least one of the arrangement, the shapes and the sizes of the resin inflow conduits, by using the combination of a numerical analysis method for calculating an injection molding process and a computer-aided optimization method. For the optimization, a proper objective function to evaluate a preferred injection molding condition is defined, which is calculated by a numerical analysis method to utilize in practice. Injection molding herein refers to a wide and general injection molding, including for example, injection-press molding, injection-compression molding, foaming-injection molding.

The mold design parameter is preferably the number and/or the locations of the gates, which are inflow openings to a cavity of the mold, and additionally, the shape, the diameter or the path of a runner, which is a inflow conduit from a nozzle to the gates and also the diameter, the angle or the like of the gates may be adopted as the mold design parameter as well.

According to the invention of mold design method, the above-described object can include obtaining a molding condition by which a mold clamping force required for molding may be reduced. For example, a material having good impact strength in polypropylene-base thermoplastic resin tends to have lower fluidity in a molten state and therefore, it is preferable to choose a resin having a fluidity as low as possible in order to enhance the impact resistance of a product. However, when the resin having low fluidity is molded in the condition for high fluidity resin molding, a mold clamping force required becomes enormous exceeding the capacity of mold clamping force of molding device, and device cost and running cost of the device increase. Even in such resin, a mold clamping force required for molding is calculated by a numerical analysis method and the mold design parameter is searched so that a molding condition for reducing the calculated mold clamping force by an optimization method, is obtained. Since the required mold clamping force is lowered by such a molding condition, even a molding device having a small mold clamping force enables to mold or energy cost for molding can be reduced.

And according to the invention of the method for designing a mold, the aforementioned object can include obtaining a molding condition by which the occurrence of weld lines in the molding is suppressed or controlled. An occurrence quantity or the location of the weld lines in a molding has a big impact on appearance and strength of a product. In the present invention, a mold design parameter is searched so that the occurrence of weld lines can be suppressed or controlled in the best performance by means of optimizing a weld line occurrence quantity in the target area calculated by a numerical analysis method, as an objective function. Accordingly a product having a good appearance and strength performance can be molded. As a weld occurrence quantity, for example, the number and the length of the weld lines is determined, and in calculation, the number of nodes where a weld line is judged to occur or the length of a line connecting such sequential nodes, is determined by the finite element method.

In the invention with regards to a method for designing a mold, it is preferable that the area in which weld line occurrence is intended to be suppressed or controlled is divided into a plurality of areas and a weighting weld line occurrence quantity in the plurality of the areas is used as a weld line evaluation value, thereby inducing weld line occurrence into a specified area or avoiding weld line occurrence in a specified area. In the case of injecting resin material from a plurality of gates, the weld line occurrence is inevitable to some extent. With reference to a resin product there are some areas where the weld line occurrence has a big impact on the product value, while in some areas the weld line occurrence is allowable to some extent. In this aspect of the present invention, the weld line occurrence quantity is reduced, along with that the weld line occurrence is avoided in the area where the weld line occurrence has a big impact on the product value and induced to the area where the weld line occurrence is allowable, thereby a good product can be molded.

In the invention with regard to a method for designing a mold has such a purpose as to obtain a molding condition in which both reduction of a mold clamping force required for molding and suppression or control of weld line occurrence in a molding product can be achieved. In this case, a plurality of objects are set in optimization and thereby the mold design parameter that enables to achieve respective objects, is searched.

In the invention with regard to a method for designing a mold, it is preferable that an objective function for optimization includes an addition of a weighted mold clamping force required for molding and a weighted weld line evaluation value for evaluating weld line occurrence. In this aspect, the balance of the two objects is settled by weighting.

In the invention with regard to a method for designing a mold, it is preferable that the mold design parameter includes the number and/or the locations of gates, which are inflow openings to cavity of the mold. In this aspect, the parameter with regard to the location of the gates for a desired injection molding condition, is searched.

In the invention with regard to a method for designing a mold, it is preferable that the mold design parameter includes the sizes and/or the shapes of gates, which are inflow openings to the cavity of the mold. In this aspect, the parameter with regard to the sizes and the shapes of the gates for a desired injection molding condition, is searched.

In the invention with regard to a method for designing a mold, it is preferable that in the case of determining the mold design parameter, a process parameter to set a resin inflow in a molding process is determined together with the mold design parameter. In this aspect, the determined parameter of the resin inflow in the molding process for a desired injection molding condition, is searched.

In the invention with regard to a method for designing a mold, it is preferable that the process parameter is a parameter that controls actions of inflow regulation valves arranged in a plurality of the resin inflow conduits. In this aspect, the parameter to control an action of the inflow regulation valves arranged in the plurality of the resin inflow conduits for a desired injection molding condition, is searched.

In the invention with regard to a method for designing a mold, it is preferable that the process parameters are optimized under a condition where at least one inflow regulation valve is opened at a certain timing during a resin filling process. In this aspect, an optimal parameter under such a practical condition that at least one inflow regulation valve is opened, is searched.

Another aspect of the present invention is to provide a method for producing an injection molding, in which in the case of implementation of injection molding by use of a mold having a plurality of resin inflow conduits to a cavity, the method comprising the steps of: determining a mold design parameter in relation to at least one of the arrangement, the shapes and the sizes of the resin inflow conduits, by combining a numerical analysis method for calculating an injection molding process with a computer-aided optimization method for a purpose of obtaining a desired injection molding condition; producing the mold based upon the determined mold design parameter; and carrying out the injection molding with the produced mold. According to the present invention, injection molding is carried out with such a mold that was produced based upon a mold design parameter obtained by optimization, under the desired injection molding condition in accordance with the purpose, thereby desired results of molding are obtained.

A further aspect of the present invention is a program for the purpose of obtaining a desired injection molding condition, in the case of implementation of injection molding by use of a mold having a plurality of resin inflow conduits to a cavity, wherein a process that determines a mold design parameter in relation to at least one of the arrangement, the shapes and the sizes of the resin inflow conduits, by combining a numerical analysis method for calculating an injection molding process with a computer-aided optimization method is carried out by a computer. According to the present invention, the mold design parameter can be calculated by a computer promptly and accurately without repetition of trial and error manually.

A further aspect of the present invention is an injection molding device comprising: a molding device main body that supplies resin material to a mold having a plurality of resin inflow conduits to a cavity, through the resin inflow conduits; a memory section that memorizes process parameters determined by combining a numerical analysis method for calculating an injection molding process with a computer-aided optimization method; and a control section which controls the molding device main body based upon process parameters in accordance with the mold to be used, and carries out injection molding by controlling time-sequentially an inflow of the resin material from the resin inflow conduits to the mold.

In this invention, one or more additives which are usually used may be added to the resin component provided that it does not interfere with the purpose of the invention. The additives include fibrous reinforcing materials such as glass fiber, silica alumina fiber, alumina fiber, carbon fiber, organic fiber derived from such plants as hemp and kenaf, and synthetic fiber; acicular reinforcing materials such as aluminum borate whisker and potassium titanate whisker; inorganic fillers such as glass beads, talc, mica, graphite, wollastonite and dolomite; mold-release enhancers such as fluororesins and metal soaps; coloring agents such as dyes and pigments; antioxidants; heat stabilizers; ultraviolet light absorbers; antistatic agents; and surfactants.

The resin preferably used in this invention is the thermoplastic resin. The thermoplastic resin may be any of those substances generally referred to as thermoplastic resins, e.g., amorphous polymers, semi-crystalline polymers, crystalline polymers and liquid crystal polymers. The thermoplastic resin may be of one type, or a blend of plural polymer components. Specifically, the thermoplastic resin may be an olefin resin such as low density polyethylene, high density polyethylene, propylene resin and ethylene propylene copolymer; styrene resin such as polystyrene, high impact polystyrene and ABS resin; an acrylic resin such as polymethyl methacrylate; polyester resin such as polyethylene terephthalate and polybutylene terephthalate; polycarbonate resin such as polycarbonate and modified polycarbonate; polyamide resin such as polyamide 66, polyamide 6 and polyamide 46; polyacetal resin such as polyoxymethylene copolymer and polyoxymethylene homopolymer; engineering plastics and super engineering plastics such as polyether sulfone, polyether imide, thermoplastic polyimide, polyether ketone, polyether ether ketone and polyphenylene sulfide; cellulose derivatives such as cellulose acetate, cellulose acetate butyrate and ethyl cellulose; liquid crystal type polymer such as liquid crystal polymer and liquid crystal aromatic polyester; and thermoplastic elastomer such as thermoplastic polyurethane elastomer, thermoplastic styrene butadiene elastomer, thermoplastic polyolefin elastomer, thermoplastic polyester elastomer, thermoplastic vinyl chloride elastomer and thermoplastic polyamide elastomer.

Preferred resin material also includes polypropylene-base thermoplastic resin. Examples of the polypropylene-base thermoplastic resin are homo-polypropylene, a block copolymer or a random copolymer of polypropylene with other olefin, or a mixture thereof.

BRIEF DESCRIPTION OF THE DRAWINGS

FIG. 10A shows a weld line control result in the case of an initial condition (in the case of no optimization) of the method for molding a resin product of the second embodiment of the present invention.

FIG. 10B shows a weld line control result in the case of optimization of the method for molding the resin product of the second embodiment of the present invention.

DESCRIPTION OF THE PREFERRED EMBODIMENTS

Figure 1:
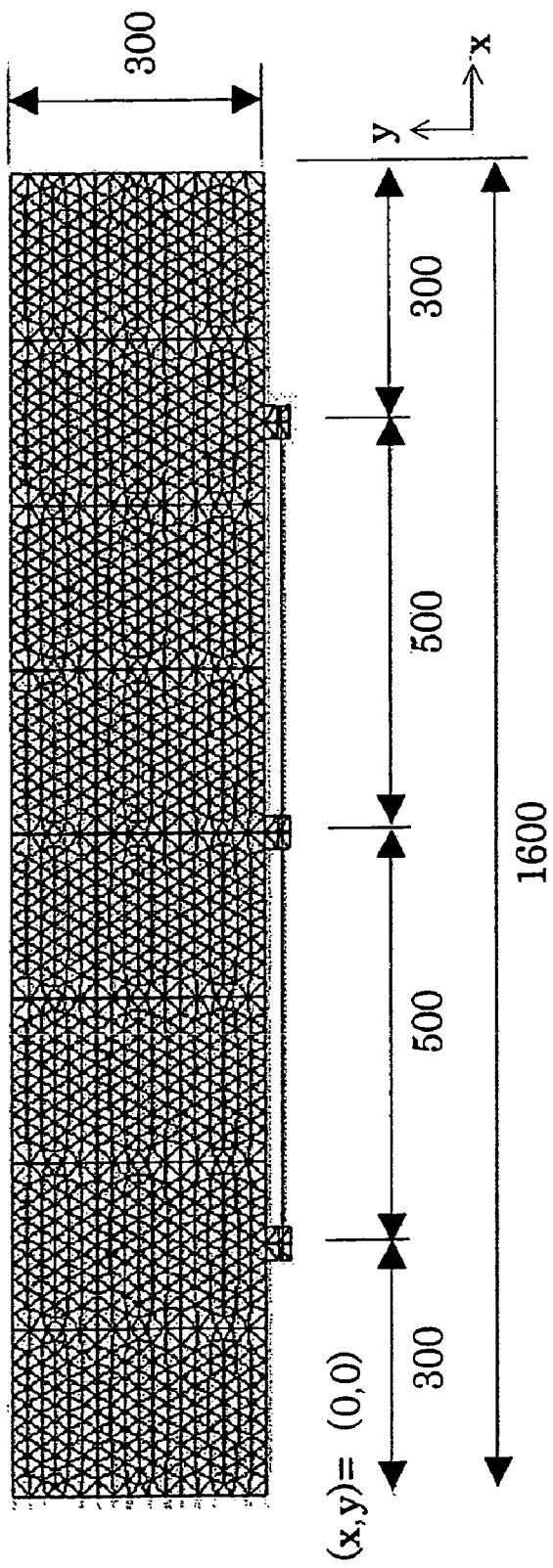
FIG. 1 shows a molding cavity and the location of gates for molding to explain a first embodiment of the present invention.
Figure 2:
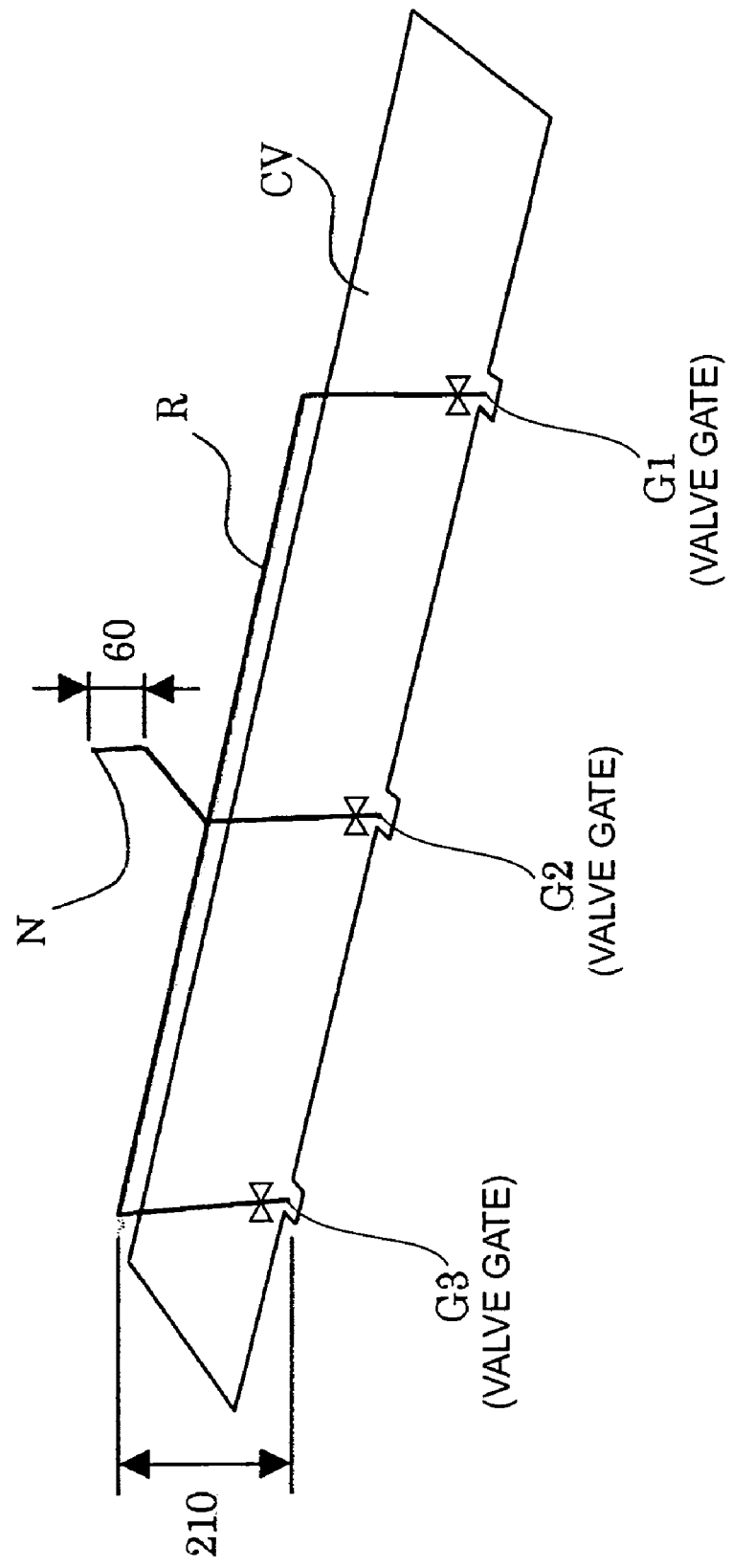
FIG. 2 shows a molding cavity and resin inflow conduits for molding to explain the first embodiment of the present invention.

A first embodiment of the present invention will be described in detail below referring to drawings. This embodiment deals with a case of manufacturing a plate-shaped member extending in one direction (a length-to-width ratio=3/16), as shown in FIG. 1, by injection molding using predetermined resin material. As depicted in FIG. 2, a cavity CV has three gates (G1, G2, and G3) at the center, the right, and the left on one side of the plate. According to the present invention, the number of gates is required only to be two or more and may be adequately determined depending on the shape and dimensions of a resin product.

The present invention has such a configuration that at least one gate is a valve gate which can be opened and closed by the valve movement, and injection molding is conducted so that weld lines are formed at desired positions through the adjustment of the valve gate opening degree. This embodiment is configured in such a way that all the three gates are valve gates as shown in FIG. 2. However, if at least one of the gates is determined to be kept fully opened or fully closed as the result of the optimization described later, there is no necessity for it to be a valve gate in an actual mold. Each gate connects with the front end of a nozzle N via a runner R. The runner R is designed to be a so-called a hot runner which is controlled to maintain a specified temperature to prevent the resin in the runner R from solidification. The runner R and the gate G1, G2 and G3 form resin inflow conduits.

Figure 11:
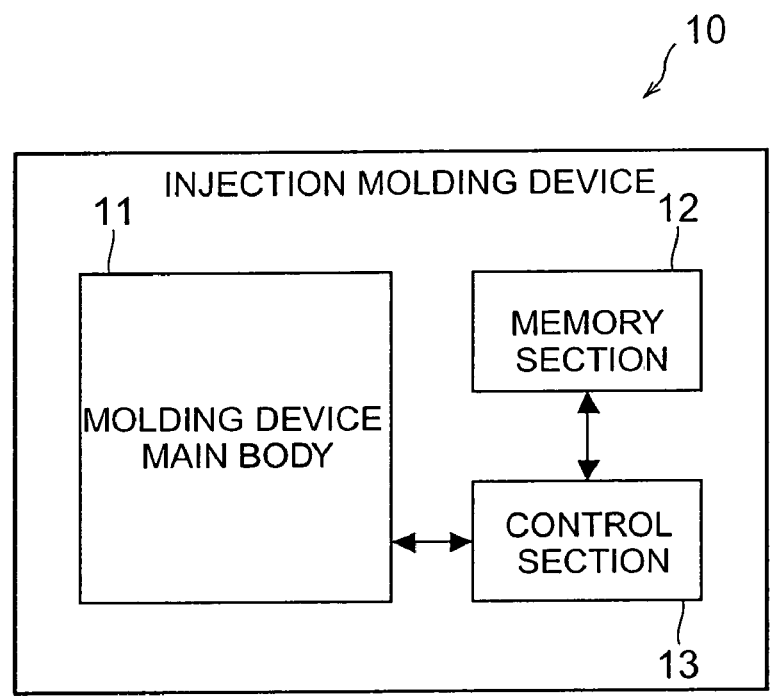
FIG. 11 shows one example of the configuration of an injection molding device according to the present invention.

FIG. 11 shows one example of the configuration of an injection molding device according to this embodiment. As shown in FIG. 11, an injection molding device 10 comprises: a molding device main body 11 which feeds molten resin from the nozzle N shown in FIG. 2; a memory section 12 which memorizes process parameters determined by the combination of a numerical analysis method for calculating an injection molding process and a computer-aided optimization method; and a control section 13 which conducts injection molding while controlling the molding device main body 11 on the basis of determined process parameters in accordance with the mold to be used and controlling time-sequentially the inflow of molten resin.

In this embodiment, a mold design parameter for obtaining the preferred injection condition related to at least one of the arrangement, the shapes and the sizes of the resin inflow conduits is determined by the combination of a numerical analysis method for calculating an injection molding process and a computer-aided optimization method, and a process parameter to set a resin inflow in the molding process, are determined together therewith. In the case of using no valve gate as the second embodiment described later, only the mold design parameter may be determined.

Figure 3:
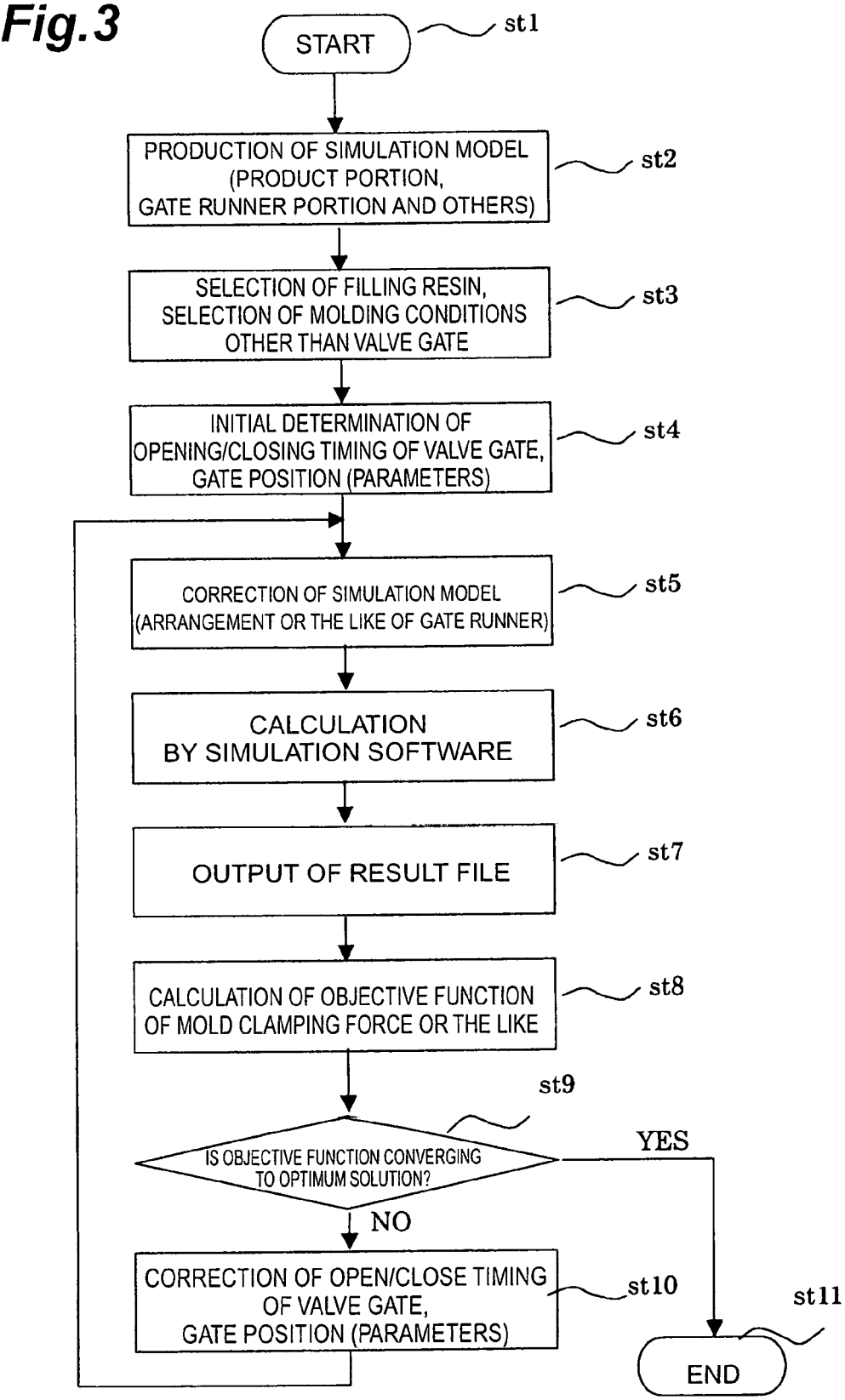
FIG. 3 shows a flowchart to explain a method for molding a resin product of the first embodiment of the present invention.

Regarding the numerical analysis method to calculate the injection molding process, the method in which the behavior of resin is analyzed based on the finite element method using calculation equations on the basis of the relationship working between elements during molding, has been brought into practical application in recent years. The embodiment adopts Moldflow Plastics Insight 2.0 rev1 (trade name, produced by Moldflow Corporation). Many similar computer-aided optimization methods have been developed. Here, iSIGHT 6.0 (trade name, produced by Engineous Software Inc.) is adopted as software. Since the analysis deals with a problem with intense nonlinearity, SA (simulated annealing) was adopted, which could explore the design space in global basis and was appreciated, therefore, as an easy-attainable global optimum, without a risk of ending in local optimum. The total flow scheme of the analysis is described below referring to the flow diagram of FIG. 3.

(1) Preparation of Simulation Model

Firstly, in Step 2, the simulation model for analyzing the resin flow during the injection molding process is produced. In the embodiment, a wide and flat plate model specified below is used.

Dimensions: 1600 mm in width, 300 mm in length, and 3 mm in thickness

Number of elements: 2862, Number of nodes: 1558, Three gates on one side

Runner diameter: 6 mmφ (Hot runner)

Gate: 4 mmφ×7.5 mm L (Valve gate)

(2) Determination of Molding Condition

In Step 3, the conditions for injection molding are determined. It is firstly necessary to enter data such as physical properties of the resin selected as the material. The resin applied here is a polypropylene-base resin, Sumitomo Noblen NP156 (trade name, produced by Sumitomo Chemical Co. Ltd., staple fiber GFPP, GF 30 wt %). The physical properties required include such as thermal conductivity, specific heat, no-flow temperature, and viscosity.

For other molding conditions, resin temperature, hot runner temperature, and mold temperature were set to 230° C., 230° C., and 50° C., respectively, the injection speed was set constant, and the injection time was set about 8 seconds.

(3) Computer-Aided Optimization Stage

The stages of Step 4 and onwards are the computer-aided optimizing stages. That is, in Step 4, the initial value of the required parameters (the open/close timing of the valve gates, and the number and the position of the gates in this case) are determined, which are design variables. In Step 5, the concerned portions of a simulation model in accordance with the values of the design valuables initially set are corrected. In Step 6, an inflow process of the resin is calculated and in Step 7, the result file is output. In Step 8, an objective function with regard to a mold clamping force and weld line occurrence is calculated based on the result file. In step 9, whether the calculated value is converging to an optimum solution, is evaluated. If not, in Step 10 the design variables are corrected based on the algorithm of the optimization method and Step 5 through Step 10 are repeated. If Step 9 determines that the objective function converges to the optimum solution, the optimization stage is completed.

Simulated annealing is adopted in the embodiment as the algorithm of the optimization method. In metal annealing, slow cooling of metals settles the individual molecules energy in a high level to a low level. The simulated annealing adopts this as a model. That is, the simulated annealing is not a method to explore the optimum solution quickly but a method allowing global exploration by generating a variety of solutions while allowing local degradation of solution. The convergence to the optimum solution is to be judged after specified iterations of calculations.

(4) Constraint Conditions on Determining Open/Close Timing

This embodiment adopts three valve gates. The open/close timing may be assumed to establish independently for each individual valve gate. In some cases, however, these valve gates cannot be manipulated independently because of the limitations in actual operation. The optimization under further restricted conditions makes it efficient to conduct the optimization operation. To this point, the following constraint conditions were adopted.

Firstly, in this embodiment, the opening degree of each valve gate is not regulated continuously or stepwise, but only two positions of open and close are adopted considering the practical applicability. Since the resin does not solidify in the hot runner, each valve gate can wait in a closed state even after the start of the injection molding, and can begin an opening action at any time afterwards. Also, a valve gate that was opened once and allowed resin to pass through can be closed. If, however, a valve gate which was once opened followed by closing is again opened, the resin in the downstream side of the valve gate may solidify, depending on the period of a closed state, and the product may have molding defects such as deterioration in appearance. As a result, possible operation patterns for a single valve gate are the following five patterns: (1) always open, (2) always close, (3) close→open, (4) open→close, and (5) close→open→close. This variation is defined as constraint condition 1a. As more simplified constraint conditions, a variation which does not use the pattern of open→close is conceivable. Namely a variation including the three patterns of (1) always open, (2) always close, (3) close→open is defined as constraint condition 1b.

On actual molding, when all the gates are simultaneously closed, runners and valve gates should be subjected to abnormally high pressure, and analysis likely induces error owing to the nature of software. For the countermeasures against this, it was defined as constraint condition 2a that at least one gate was kept opened during the molding process. As a more simplified constraint condition, it is adoptable to always keep one gate opened, which was defined as constraint condition 2b.

(5) Determination of Opening/Closing Timing as a Design Variable

With the combination of either of the constraint condition 1a or 1b and either of the constraint condition 2a or 2b, various constraint conditions with regard to actions of the valve gates are derived. Herein the combination of the constraint condition 1b and 2b that is the simplest combination, was adopted. Namely one gate that is always kept opened out of the three gates is chosen as a regulation gate first, and then the other two gates are determined as arbitrary control gates and the timing to make the two gates open is optimized as independent setting variables. In the embodiment, the optimization was carried out both in the case where the gate G1 is always kept opened and in the case where the gate G2 is always kept opened.

(6) Gate Position as a Design Variable

Here, x-coordinates of a gate position was set as a design variable (real number). Since a gate portion and a product portion were needed to join (sharing a node), the whole gate portion was shifted in parallel so that the gate comes to the position (x-coordinates after correction) that is the calculated node position of the product portion closest to the gate position after the shift. After the shifting of the gate portion, by means of shifting the node of the runner portion, each runner was extended/moved to the corresponding position.

(7) Objective Function

As the objective function in this embodiment, (weld line occurrence+mold clamping force required for molding) was used. Controlling the weld line occurrence is essential for appearance and strength of a product. And reduction of mold clamping force leads to reduction in size of a device, energy saving, and protection of a mold, providing reduction of costs. Each of these items will be explained below.

(7-1) Evaluation of Weld Line Occurrence (1) Weld Line Judgment

A flow front merging angle was calculated for each node of a simulation model, based on which the weld line was judged.

(2) Weld Line Detection in a Specified Area

Figure 4:
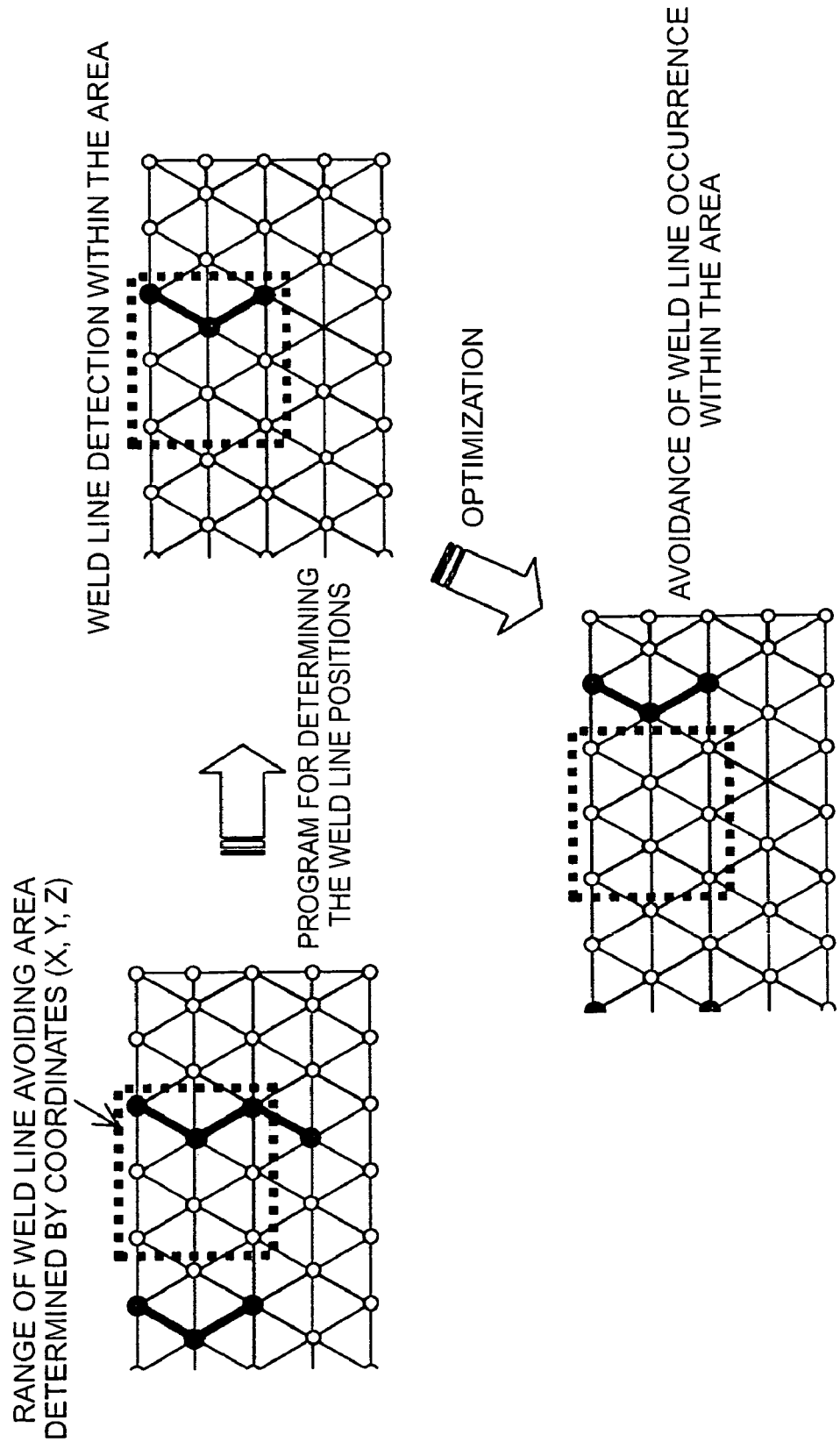
FIG. 4 shows a weld line control process in the method for molding the resin product of the first embodiment of the present invention.

For some molding products, the avoidance of weld line occurrence is requested only in specified areas (by shifting the weld line to other areas) . To cope with the request, a program for detecting the weld line only in specified areas was produced (see FIG. 4). The program counts weld line occurrence points existing only in predetermined areas (rectangular areas having the same center and the same longitudinal direction as those of the product, the areas being a portion of 400 mm in width and 100 mm in length and a portion of 800 mm in width and 100 mm in length) and outputs the count to a file. As for determination of the specific area, for example, a polygonal area may be defined by inequalities or the like using coordinates. An arbitrarily shaped areas can be defined by a method to memorize the nodes in the area.

(7-2) Mold Clamping Force Required for Molding

Mold clamping force is obtained by multiplying the resin pressure calculated using simulation software by the projected area.

(7-3) Final Objective Function

The objective function was given by:

Objective function=$A \times \delta + B$ where A is the number of the weld lines formed (number of nodes) within a specified area, B (ton) is the mold clamping force required for molding, and δ is a weighting factor. In the case of attaching importance to weld line occurrence, the value δ should be increased. According to this embodiment, δ=1000 was adopted to give priority to the prevention of weld line occurrence. Although the weld line evaluation becomes simple if the above-described number of occurrence nodes is used, it is preferable that, when the intervals of nodes in the simulation model are uneven, the number of nodes is converted to the weld line length. When the weld line strength is also used for evaluation, if the temperature and the pressure of merging resin is additionally considered, more accurate result is obtained.

(8) Optimization Calculation Example

Gate positions and gate opening/closing timings in injection molding of the product as shown in FIG. 1 was optimized applying the following initial conditions and constraint conditions.

(Condition A)

In case the gate G1 is always kept opened and opening timings of the gates G2, G3 are variable.

Constraint Condition: $1100 \leq x1 \leq 1500$, $600 \leq x2 \leq 1000$, $100 \leq x3 \leq 500$, $0 \leq t2 \leq 8.0$ s, $0 \leq t3 \leq 8.0$ s Initial Condition: x1=1300, x2=800, x3=300, t2=4.0 s, t3=4.0 s (Condition B)

In case the gate G2 is always kept opened and opening timings of the gates G1, G3 are variable.

Constraint Condition: $1100 \leq x1 \leq 1500$, $600 \leq x2 \leq 1000$, $100 \leq x3 \leq 500$, $0 \leq t1 \leq 8.0$ s, $0 \leq t3 \leq 8.0$ s Initial Condition: x1=1300, x2=800, x3=300, t1=4.0 s, t3=4.0 s.

Herein, x1, x2, and x3 (mm) are x-coordinates of the gate G1, the gate G2, and the gate G3 respectively, and t1, t2, and t3 are the opening timing of the gate G1, the gate G2, and the gate G3, respectively.

The results are shown in Table 1 and Table 2.

TABLE 1

| | Gate position (x-coordinates) [mm] | | | Gate opening Timing*1 [s] | | | Number of weld line occurrence (Number of Nodes) | | | Mold clamping force | |
|---|---|---|---|---|---|---|---|---|---|---|---|
| | | | | | | | Whole area | Center 1 | Center 2 | | |
| Condition | G1 | G2 | G3 | G1 | G2 | G3 | 1800 W × 300 L | 400 W × 100 L | 800 W × 100 L | [ton] | Remarks |
| (1) | 1300 | 800 | 300 | ○ | X | X | 0 | 0 | 0 | 2540 | One-point gate |
| (2) | | | | ○ | Δ | Δ | 0 | 0 | 0 | 1660 | Cascade |
| (3) | | | | ○ | X | ○ | 18 | 6 | 6 | 1010 | Two-point gate |
| (4) | | | | ○ | ○ | ○ | 18 | 0 | 4 | 1140 | Three-point gate |
| (5)*2 | (Gate position fixed) | | | ○ | 0.7 | 4.0 | 14 | 0 | 2 | 1100 | Valve control |
| A | 1220 | 800 | 100 (gate position shifted) After optimization | ○ | 5.4 | 1.1 | 14 | 0 | 0 | 760 | Gate shift + Valve control |

*1 ○: always open, X: always close, Δ: open after flow front arrival (Cascade control)
*2 Optimization result of gate open timing under the condition of weld line occurrence avoidance in Center 1

TABLE 2

| | Gate position (x-coordinates) [mm] | | | Gate opening Timing*1 [s] | | | Number of weld line occurrence (Number of Nodes) | | | Mold clamping force | |
|---|---|---|---|---|---|---|---|---|---|---|---|
| | | | | | | | Whole area | Center 1 | Center 2 | | |
| Condition | G1 | G2 | G3 | G1 | G2 | G3 | 1800 W × 300 L | 400 W × 100 L | 800 W × 100 L | [ton] | Remarks |
| (6) | 1300 | 800 | 300 | X | ○ | X | 0 | 0 | 0 | 1310 | One-point gate |

TABLE 2-continued

| Condition | Gate position (x-coordinates) [mm] G1 | G2 | G3 | Gate opening Timing*1 [s] G1 | G2 | G3 | Number of weld line occurrence (Number of Nodes) Whole area 1800 W × 300 L | Center 1 400 W × 100 L | Center 2 800 W × 100 L | Mold clamping force [ton] | Remarks |
|---|---|---|---|---|---|---|---|---|---|---|---|
| (7) | | | | Δ | ○ | Δ | 0 | 0 | 0 | 1160 | Cascade |
| (4) | (Gate position fixed) | | | ○ | ○ | ○ | 18 | 0 | 4 | 1140 | Three-point gate |
| (8)*2 | | | | 4.5 | ○ | 3.1 | 10 | 0 | 0 | 1130 | Valve control |
| B | 1500 | 800 | 120 | 0.5 | ○ | 3.4 | 18 | 0 | 0 | 1070 | Gate shift + Valve control |
| | (gate position shifted) After optimization | | | | | | | | | | |

*1 ○: always open, X: always close, Δ: open after flow front arrival (Cascade control)
*2 Optimization result of gate open timing under the condition of weld line occurrence avoidance in Center 1

(9) Result of Consideration

In these tables, (1) through (8) are for the conventional method and in any one thereof the positions of the gates are fixed. With reference to gate opening timing, (1) and (6) are for the one-point gate, and (2) and (7) are so-called "cascade control", in which when the resin which entered through the gate which was opened first reaches another gate, then the gate is opened. In (3), two gates are always kept opened, and in (4), three gates are always kept opened. The optimization was carried out in (5) and (8) where the weld line avoidance was aimed at the central portion 1 that is the area narrower than conditions A, B of the embodiment and only the opening timings of the gates were optimized. From these results such molding conditions that no weld line occurred in the central portion 2 of a product and the mold clamping force was low, could not be obtained.

On the other hand, in the embodiment of the present invention, the weld line occurrence in the desired area (central portion 2) was suppressed and also the mold clamping force was maintained at a low level by controlling the gate positions and the gate opening timings. In particular, in the case of condition A, the resin was injected from the gates G1, G3 on the both sides for the first half of molding and the central gate G2 was opened for the second half, thereby suppressing the weld line occurrence as well as reducing the mold clamping force was achieved. Accordingly a mold can be designed based upon a product shape and a injection molding process by this method and also a practical molding method using such design result can be provided.

In the above embodiment, only one single area is targeted for suppressing the weld line occurrence. However, the case of dispersed areas can be treated in a similar manner by structuring the objective function as the sum of individual number of weld line formed. Furthermore, the weighted sum in each area can deal with the plurality of areas having different degrees of importance. As described above, the weld line occurrence positions can be more finely controlled through the control of weld line occurrence at individual areas.

Figure 5:
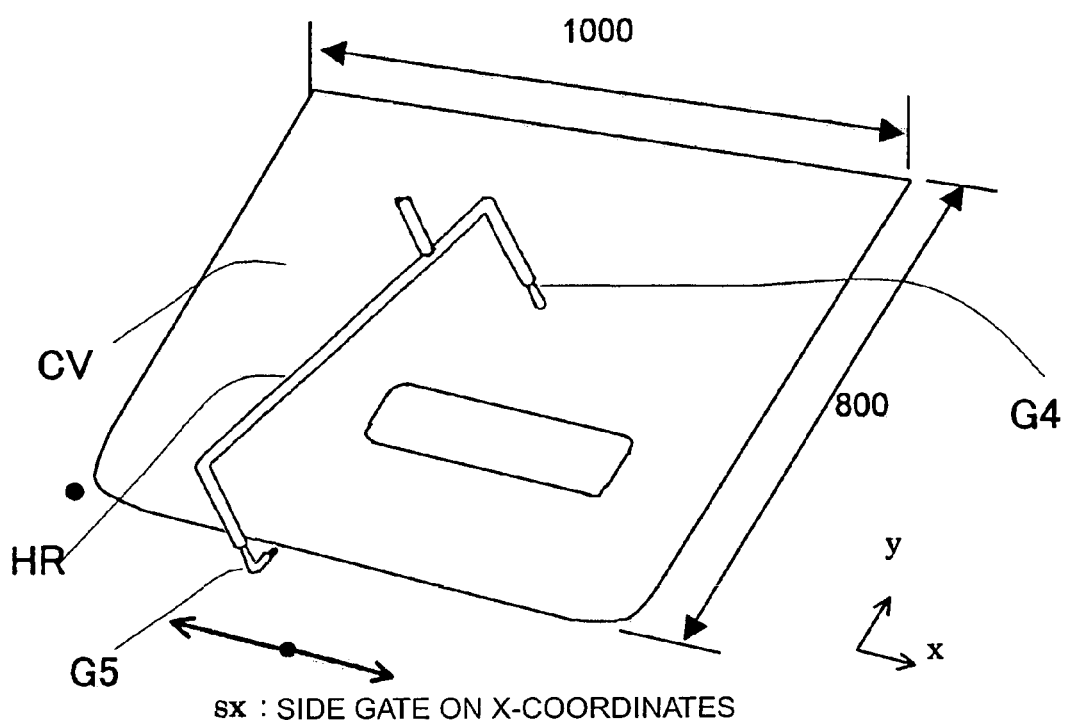
FIG. 5 shows a molding cavity and the location of gates to explain a second embodiment of the present invention.
Figure 6:
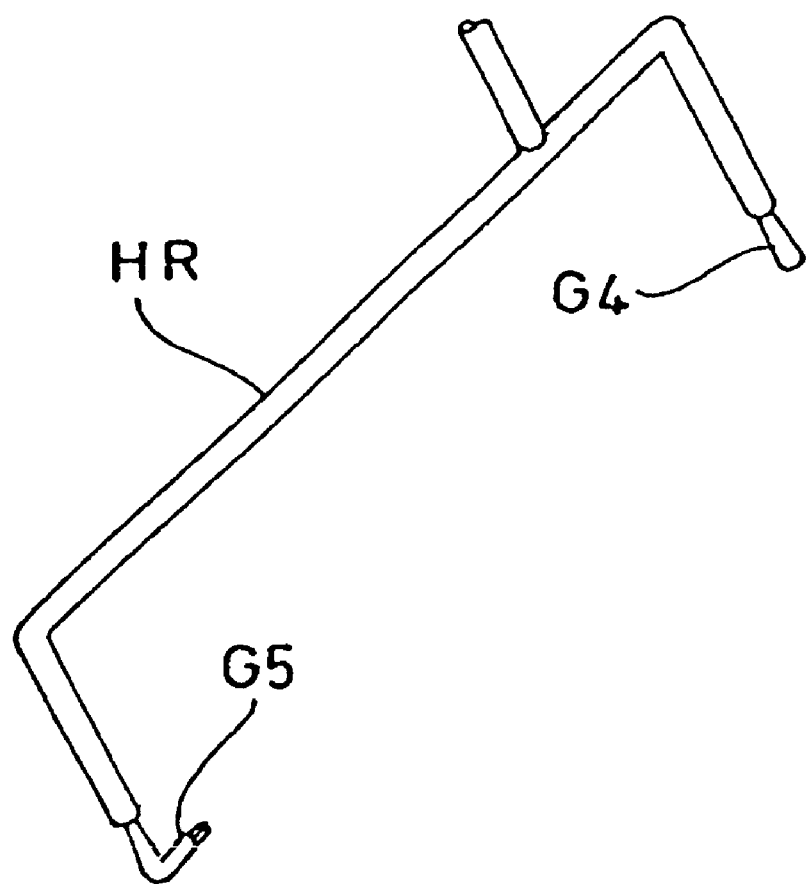
FIG. 6 shows an enlarged view of a gate runner portion in FIG. 5.

Hereinafter the second embodiment of the present invention will by explained. The embodiment, as shown in FIG. 5, illustrates a case where a trapezoid (a length-to-width ratio=8/10) flat article close to a square having an opening inside is manufactured by an injection molding method. As shown in FIG. 5 and FIG. 6, a first gate (central gate) G4 is arranged in the central part of the flat article in a cavity CV and a second gate (side gate) G5 is arranged on one side across over the opening.

Figure 7A:
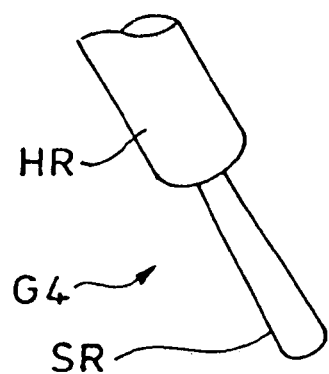
FIG. 7A shows an enlarged view of a central gate portion in FIG. 5.
Figure 7B:
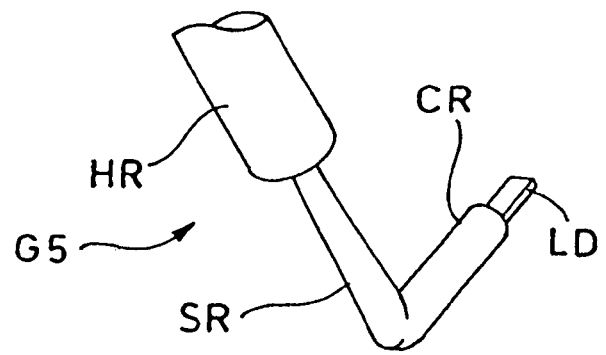
FIG. 7B shows an enlarged view of a side gate portion in FIG. 5.

In the embodiment, any one of the gates is not a valve gate but a normal gate that is always kept opened and the optimization was carried out using the sizes or positions of the gates as design variables. The central gate G4 is formed vertical to the cavity CV and the side gate G5 is formed in the direction perpendicular to the side line on the same plane with the cavity CV. As shown in FIG. 7A, the central gate G4 is constructed such that a tip of the hot runner HR is connected to the cavity through a sprue SR having a smaller diameter than that of the tip. In the embodiment, the sprue SR is formed in a tapered shape enlarging in a diameter from the hot runner side to the cavity side. The side gate G5, as shown in FIG. 7B, is constructed such that a tapered sprue SR is formed at a tip of the hot runner HR, and the tip end of the sprue SR forms a cold runner CR bent along the face of the cavity CV which has a land portion LD with a rectangular cross section on a tip of the cold runner CR. The hot runner HR is controlled to a predetermined temperature so that the resin is not solidified inside, while a portion after the sprue SR has a temperature less than the melting point similar to that of the mold. A resin inflow conduit is composed of the hot runner HR, and the gates G4, G5 including the sprue SR, the cold runner CR, and the land portion LD.

Figure 8:
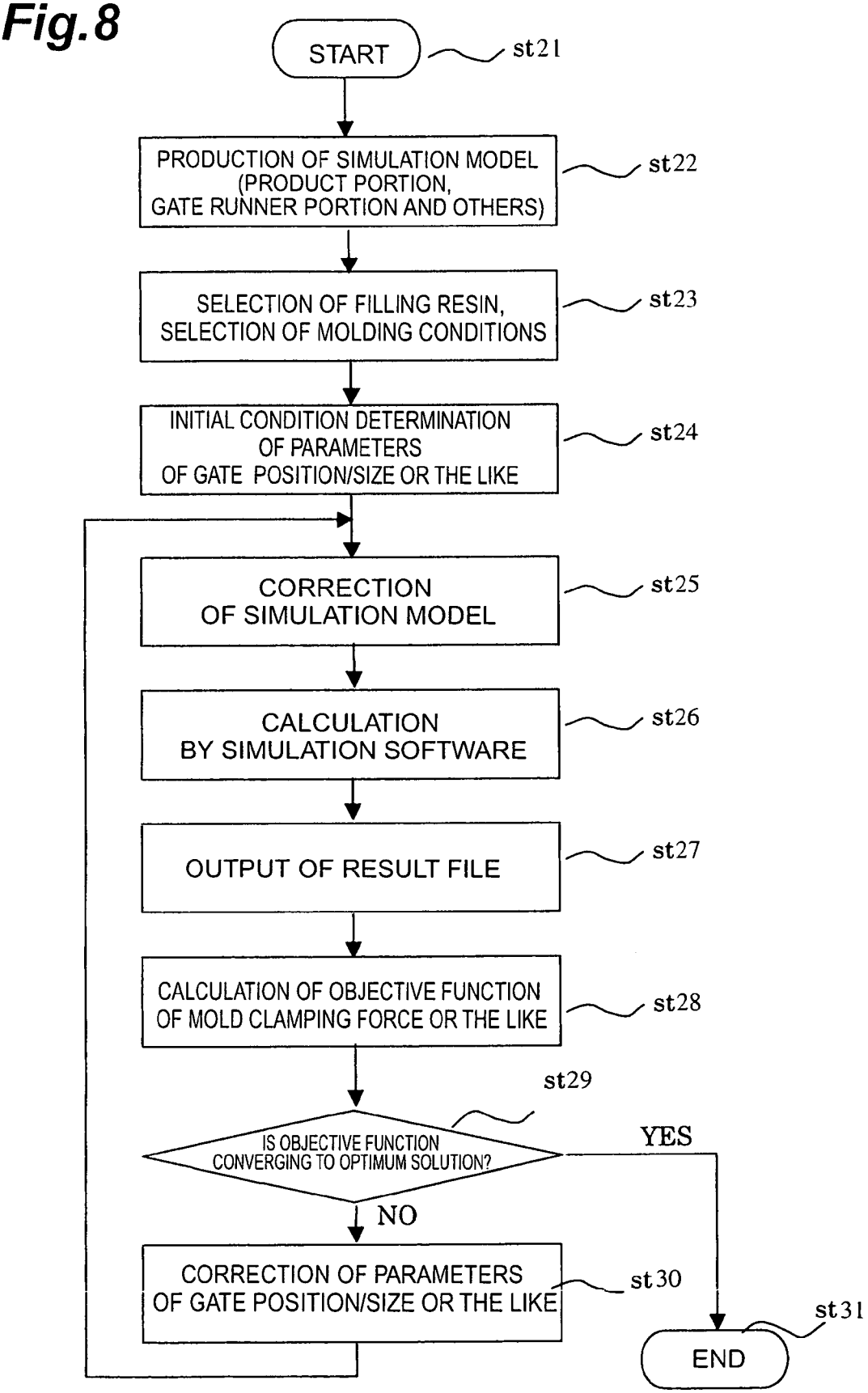
FIG. 8 shows a flowchart to explain a method for molding a resin product of the second embodiment of the present invention.

In the embodiment, since a valve gate is not used, process parameters varying in the molding process are not adopted as design variables, and only mold design parameters in relation to at least one of the arrangement, the shapes and the sizes of the resin inflow conduits are determined for the purpose of providing a preferable molding condition by the combination of a numerical analysis method for calculating an injection molding process with a computer-aided optimization method. As a method of numerical analysis to calculate an injection molding process, Moldflow Plastics Insight 2.0 rev1 (trade name, produced by Moldflow Corporation) was used and as software of a computer-aided optimization, iSIGHT 6.0 (trade name, produced by Engineous Software Inc.) and simulated annealing were used as an optimization method. The flow of the analysis will be explained along a flow chart in FIG. 8 as follows.

(1) Preparation of Simulation Model

Firstly in Step 22, a flat model described below is produced as simulation model.

Size: 1000 mm in width, 800 mm in length, 2.0 mm to 3.5 mm in thickness
Opening: 400 mm in width, 100 mm in length
Number of elements: 8136, Number of nodes: 4053
Gate: two gates in the center and a side
Runner diameter: 16 mm$\phi$ (hot runner), 8 mm$\phi$ (cold runner)
Shape of side gate land shape: rectangular cross section, 10 mm in length
Center gate shape: 4.8 mm$\phi$ (tip)→8.0 mm$\phi$ (product)

(2) Determination of Molding Condition

In Step 23, the conditions for injection molding are determined. It is necessary to first enter the data such as physical properties of the resin selected as the material. The resin applied here are, polypropylene-base thermoplastic resin Sumitomo Noblen AZ564. Physical properties required are, for example, thermal conductivity, specific heat, no-flow temperature and viscosity. For other molding conditions, the resin temperature, the hot runner temperature, and the mold temperature are set to 210° C., 210° C., and 40° C., respectively, the injection speed is set constant, and the injection time is set about 2 seconds.

(3) Computer-Aided Optimization Stage

The stage of Step 24 and onwards, in Step 24 the initial values of design variables (the position of the side gate G5 and the sizes of both gates) are determined. In Step 25, a simulation model is corrected in accordance with the initial values of the design variables determined. And in Step 26, an inflow process of the resin is calculated and in Step 27, the result file is output. And in Step 28, an objective function with regard to a mold clamping force and weld line occurrence is calculated based upon the result file and in Step 29, whether the calculated value is converging to an optimum solution, is evaluated. If not, in Step 30 the design variables are corrected based upon the algorism of the optimization method and Step 25 to Step 30 are repeated. If Step 29 determines that the objective function converges to the optimum solution, the optimization stage is completed.

(4) Design Variable

Herein the following parameters with regard to two gates are defined as design variables.

Figure 9B:
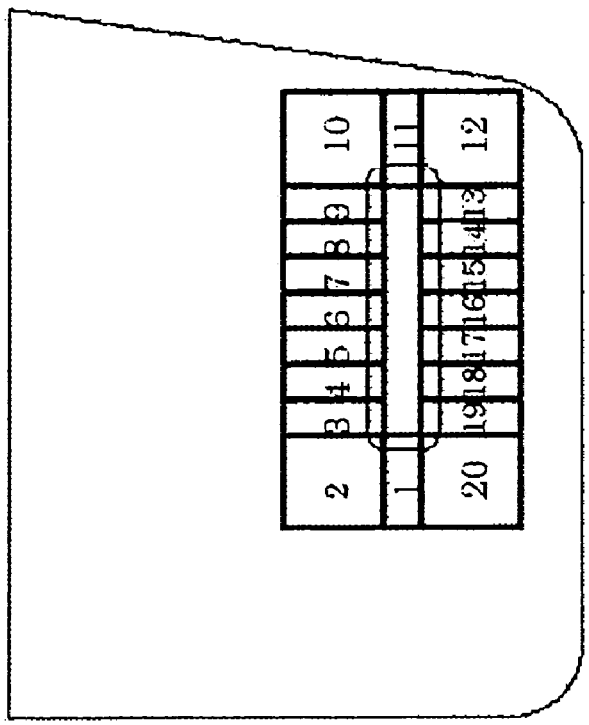
FIG. 9B shows the welding evaluation area of the second embodiment of the present invention.
Figure 9A:
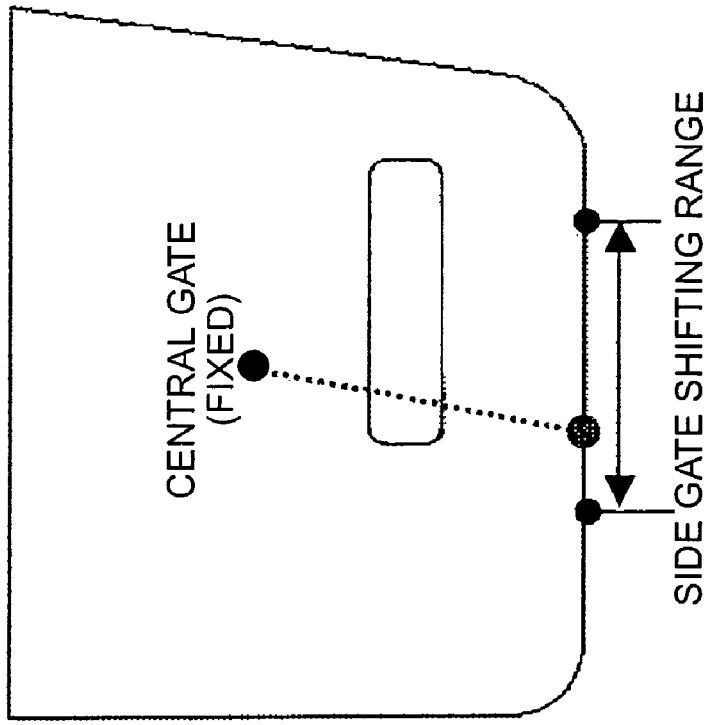
FIG. 9A shows a shift range of the side gate of the second embodiment of the present invention.

(1) A position of the side gate G5 on the lower side-line of the cavity CV in FIG. 5. Taking the point of left bottom corner as the coordinate origin, when x-coordinates (sx) varies the side gate G5 shifts as shown in FIG. 9A.
(2) Land width (sw) of the side gate G5
(3) Land thickness (st) of the side gate G5
(4) Cold runner diameter (sd) of the side gate G5
(5) Gate diameter (cd) of the central gate G4

(5) Objective Function

The objective function, in the same way as the former embodiments, is sum of a mold clamping force obtained by the injection mold analysis and the weld line evaluation value, but the present embodiment has an object of inducing weld line occurring in a periphery of the opening to a specific area. Namely, as shown in FIG. 9B, a zone in a periphery of the opening of a molding body is divided into 20 areas each of which has an opening edge with the same length. These areas are categorized as the areas (1, 3-9, 11, 13-19) located in an edge of the opening and the areas (2, 10, 12, 20) located in the four corners thereof. A weighting factor is set for each area and a weld line evaluation value is defined as sum of the product of the weld line occurrence number detected in each area and the weighting factor. The weighting factor 1 was given to the desired area to have weld line occurrence, and the weighting factor 2500 was given to the area furthest from the above weld line occurrence area. The weighting factors ranging from 1 to 2500 were allotted stepwise between these areas.

Weld line evaluation value=$\Sigma As*Ws$

S: Area number (s=1 to 20) in a periphery of the opening, As: Weighting factor of each area, Ws: Number of weld line (number of nodes) occurred in each area. The sum of the above weld line evaluation value and the mold clamping force required for molding was assigned as the whole objective function.

Objective function=(Weld line evaluation value+Mold clamping force)

(6) Optimization Calculation Example

Optimization was carried out after the initial conditions, the constraint conditions and weighting were determined as shown below.

Initial condition[mm]: sx=400, sw=5, st=1, sd=8, cd=8
Constraint condition: $300 \leq sx \leq 700$, $3 \leq sw \leq 15$, $1 \leq st \leq 3$, $4 \leq sd \leq 12$, $4 \leq cd \leq 12$ With regard to weighting, the weighting factor As of each area is assigned as follows to induce weld lines to the areas 10, and 20.

A10, A20 . . . 1
A1, A9, A11, A19 . . . 500
A2, A8, A12, A18 . . . 1000
A3, A7, A13, A17 . . . 1500
A4, A6, A14, A16 . . . 2000
A5, A15, . . . 2500

The results are shown in Table 3, FIG. 10A and FIG. 10B.

TABLE 3

|  | Unit | Initial value | Optimization result |
| --- | --- | --- | --- |
| Gate position (sx) of side gate | [mm] | 400 | 471 |
| Land width (sw) of side gate | [mm] | 5.0 | 7.5 |
| Land thickness (st) of side gate | [mm] | 1.0 | 1.7 |
| Cold runner diameter (sd) of side gate | [mm] | 8.0 | 11.0 |
| Gate diameter (cd) of center gate | [mm] | 8.0 | 8.1 |
| Mold clamping force | [ton] | 1532 | 857 |
| Weld line estimation value | [—] | 10008 | 4 |
| Objective function | [—] | 11540 | 861 |

FIG. 10A shows the result of the initial conditions and FIG. 10B shows the result of the optimization. In the former, the weld line occurs at a position other than the areas 10, 20, and in the latter, only the short length weld line occurs in the area 20. The embodiment had the purpose of transferring the right weld line into the area 10 while keeping the left weld line still remaining in the area 20, but in the 10 process of transferring the position of the right weld line occurrence into the area 10, the right weld line has disappeared. It is understood from this result that the weld line occurrence at areas other than the areas 10, 20 could be avoided by optimizing the gate position and the gate runner diameter simultaneously and the mold clamping force could be reduced to less than 60% of the initial one.

However, in the above embodiment a mold clamping force is adopted as an additional objective function, but proper parameters in accordance with each condition can be adopted as the objective function. And in the embodiment the objective function is constructed as sum of a plurality of element objective functions, but a proper calculation can be used based upon situations.

As explained above, according to the present invention, a mold design parameter in relation to at least one of the arrangement, the shapes and the sizes of the resin inflow conduits can be promptly and accurately calculated without repetition of manual trial and error. Accordingly even in the case of injection molding of resin product with any shape, the design result of a mold providing control of the weld line occurrence and reduction of the mold clamping force can be obtained. And by using such design result, a product with a good performance in accordance with an application purpose thereof can be molded, providing reduction of device costs and labor costs thereof.

What is claimed is:

1. A method for obtaining a mold design parameters, in an event of implementation of injection molding using a mold having a plurality of resin inflow conduits to cavity, comprising a step of obtaining a mold design parameter which is related to at least one of the arrangement, the shapes and the sizes of said resin inflow conduits, by combination of a numerical analysis method for calculating an injection molding process and a computer-aided optimization method, for the purpose of obtaining a desired injection molding condition, wherein said purpose is to obtain a molding condition in which weld line occurrence in a molding can be suppressed or controlled, and wherein an areas in which weld line occurrence is intended to be suppressed or controlled is divided into a plurality of areas and a weighting weld line occurrence quantity in the plurality of the areas is used as a weld line evaluation value, thereby inducing weld line occurrence into a specified area or avoiding weld line occurrence in a specified area.

2. The method for obtaining mold design parameters according to claim 1, wherein said purpose is to obtain a molding condition in which both reduction of a mold clamping force required for molding and suppression or control of weld line occurrence in a molding product can be achieved.

3. The method for obtaining mold design parameters according to claim 2, wherein an objective function for optimization includes a weighting addition of mold clamping force required for molding and a weld line evaluation value for evaluating weld line occurrence.

4. The method for obtaining mold design parameters according to claim 1, wherein said mold design parameter includes numbers and/or positions of gates that are inflow openings to cavity of said mold.

5. The method for obtaining mold design parameters according to claim 1, wherein said mold design parameter includes the sizes and/or the shapes of gates that are inflow openings to the cavity of said mold.

6. The method for obtaining mold design parameters according to claim 1, wherein in case of determining said mold design parameter, a process parameter to set a resin inflow in a molding process is determined together with the mold design parameter.

7. The method for obtaining mold design parameters according to claim 6, wherein said process parameter is a parameter that controls actions of inflow regulation valves arranged in a plurality of the resin inflow conduits.

8. The method for obtaining mold design parameters according to claim 7, wherein said process parameters are optimized under a condition where at least one inflow regulation valve is opened at a certain timing during a resin filling process.

9. A method for producing an injection molding in the case of implementation of injection molding with a mold having a plurality of resin inflow conduits to a cavity, comprising the steps of:

determining a mold design parameter in relation to at least one of the arrangement, the shapes and the sizes of said resin inflow conduits, by combining a numerical analysis method for calculating an injection molding process with a computer-aided optimization method for a purpose of obtaining a desired injection molding condition;

producing the mold based upon the determined mold design parameter; and carrying out the injection molding with the produced mold, wherein said purpose is to obtain a molding condition in which weld line occurrence in a molding can be suppressed or controlled, and wherein an area in which weld line occurrence is intended to be suppressed or controlled is divided into a plurality of areas and a weighting weld line occurrence quantity in the plurality of the areas is used as a weld line evaluation value, thereby inducing weld line occurrence into a specified area or avoiding weld line occurrence in a specified area.

10. A computer readable medium having stored thereon instructions for enabling a computer to execute a process for obtaining a desired injection molding condition in the case of implementation of injection molding by use of a mold having a plurality of resin inflow conduits to a cavity, wherein a process that determines a mold design parameter in relation to at least one of the arrangement, the shapes and the sizes of said resin inflow conduits, by combining a numerical analysis method for calculating an injection molding process with a computer-aided optimization method is carried out by a computer, wherein said purpose is to obtain a molding condition in which weld line occurrence in a molding can be suppressed or controlled, and wherein an area in which weld line occurrence is intended to be suppressed or controlled is divided into a plurality of areas and a weighting weld line occurrence quantity in the plurality of the areas is used as a weld line evaluation value, thereby inducing weld line occurrence into a specified area or avoiding weld line occurrence in a specified area.

11. An injection molding device comprising:

a molding device main body that supplies resin material to a mold having a plurality of resin inflow conduits to a cavity, through said resin inflow conduits;

a memory section that memorizes process parameters determined by combining a numerical analysis method for calculating an injection molding process and a computer-aided optimization method; and a control section which controls said molding device main body based upon process parameters in accordance with the mold to be used, and carries out injection molding by controlling time-sequentially an inflow of the resin material from said resin inflow conduits to said mold, wherein said purpose is to obtain a molding condition in which weld line occurrence in a molding can be suppressed or controlled, and wherein an area in which weld line occurrence is intended to be suppressed or controlled is divided into a plurality of areas and a weighting weld line occurrence quantity in the plurality of the areas is used as a weld line evaluation value, thereby inducing weld line occurrence into a specified area or avoiding weld line occurrence in a specified area.

* * * * *